United States Patent [19]

Hirose et al.

[11] 4,043,642
[45] Aug. 23, 1977

[54] ZOOM LENS SYSTEM HAVING ELECTRICAL CONTROL OF MOVING ELEMENTS

[75] Inventors: Ryusho Hirose, Machida; Takao Tsuji, Kawasaki, both of Japan

[73] Assignee: Canon Kabushiki Kaisha, Tokyo, Japan

[21] Appl. No.: 627,867

[22] Filed: Oct. 31, 1975

Related U.S. Application Data

[63] Continuation of Ser. No. 446,760, Feb. 28, 1974, abandoned.

[30] Foreign Application Priority Data

| Mar. 6, 1973 | Japan | 48-26343 |
| Aug. 2, 1973 | Japan | 48-87041 |
| Aug. 6, 1973 | Japan | 48-88149 |

[51] Int. Cl.² ............................................. G02B 15/18
[52] U.S. Cl. ...................................... 350/184; 350/187; 354/195
[58] Field of Search ............... 350/184, 186, 187; 354/195

[56] References Cited

U.S. PATENT DOCUMENTS

3,391,973  7/1968  Laurent ........................... 350/186
3,541,941  11/1970  Barr et al. ........................ 350/187

Primary Examiner—John K. Corbin
Assistant Examiner—Conrad Clark
Attorney, Agent, or Firm—Toren, McGeady and Stanger

[57] ABSTRACT

From an object side, there are a fixed lens, a first movable lens, a second movable lens, and a fixed lens being positioned in that order, wherein the first movble lens is coupled with a first position detecting means and the second movable lens is coupled with a second position detecting means, and at the same time it is coupled with a lens shifting means which is controlled by the above mentioned two detecting means. For photographing which involves zooming, first the second movable lens is shifted for focusing. Next, as the first movable lens is shifted, the amount of shifting is detected by the first detecting means and then the second movable lens is shifted based on the detected value of the same. The amount of shifting of said second movable lens is determined by a functional equation which has been set as the optical system is designed, while the position adjustment of the second movable lens is controlled by the lens shifting means and the second detecting means. While magnification variation is performed as a result of shifting of the first movable lens and of the second movable lens, there will be no shifting of image in an image.

9 Claims, 15 Drawing Figures

ZOOM LENS SYSTEM HAVING ELECTRICAL CONTROL OF MOVING ELEMENTS

This is a continuation of application Ser. No. 446,760 which was filed Feb. 28, 1974 now abandoned.

BACKGROUND OF INVENTION

The present invention is related to a zoom lens and particularly to a zooming system to perform the function of a focusing lens after a variator lens group.

There have been a number of lens system of the zooming type proposed, for example, a zoom lens system suited for wide angle zooming or a zoom lens system with the nearest shooting distance which is short and with a small outer diameter of lens. Such systems all make correction of a focusing plane in a mechanical manner. A prior art lens system is composed of a focusing lens group, a variator lens group, a compensator lens group and an imaging lens group.

Of these basic four groups, the focusing lens group operates so that each object a different respective distance will not cause the shifting of image, and the compensator lens group prevents the shifting of image during zooming with respect to one object, and, in general, stabilization of focusing is done by so moving the compensator lens group along a curved cam.

Also in a zoom lens system, with an exception of a lens system with a low magnification, a focusing group ordinarily has a positive refractive power for a requirement for compactness of a device, while a variator lens group which has a function of magnification variation has a negative refractive power.

Therefore, as has been known as a general characteristics of a zoom lens, the shorter the object distance, the more the focusing lens has to be moved out and, as a result, the outside diameter of the lens required will sharply increase. Accordingly, it has been difficult to make the object distance which allows photographing as short as possible, that is, to make the nearest distance as short as possible, and at the same time, to make the lens part small, as desired by a user of camera.

Contrary to this, when a focusing function is provided for the part after the variator lens groups, the outer diameter of lens will not sharply increase even for the nearest distance. The reason why such rear focus system as mentioned above is not employed is that, if an object position is different for one zooming position, the amount of shifting of the focusing lens group will be different.

Furthermore, when the zooming position changes as zooming is done, the amount of shifting of a focusing group will become different with respect to such object distance as being same as that in the zooming position. Therefore in practical photographing, since there are a number of such focal distances, that the object distance can be selected from the nearest distance to the infinite and the zooming position can be selected from wide angle to telescopic, it is deemed impossible practically to change the amount of shifting of the focusing group at the same time zooming is done, further and to change the amount of shifting of the focusing group depending on the object distance mechanically. While there is a lens system where a focal point is adjusted by moving the lenses behind a variator lens, as a zoom lens by which close photographing is possible, such system inevitably will have the shifting of the focal point taking place during zooming, and except as used for special photographing purpose, it cannot be used as an ordinary zoom lens. Thus, the part before the variator lens has generally had of a zoom lens the focusing function, or a zooming part and a focusing group has been used in common taking advantages of the depth of field of a lens system for using the same for a zoom lens with low magnification and dark F-number, as a zone focusing system.

SUMMARY OF THE INVENTION

An object of the present invention is, for eliminating the above mentioned various disadvantages, to provide a zoom lens system having such function as will enable remote control or presetting and will have a high degree of accuracy, by replacing the conventional mechanical correction means, especially a part with cam mechanism with an electrical means.

Another object of the present invention is to provide an arrangement for varying detecting accuracy to a detecting means for detecting the position of a movable lens group.

Still another object of the invention is to select significant figures for operation for detecting a set value of diaphragm aperture together with detection of a set value of focal distance and of a set value of imaging position thus setting with high accuracy the positions of lens groups and for making the accuracy of operation a reasonable one in connection with said set values.

Figure 1:
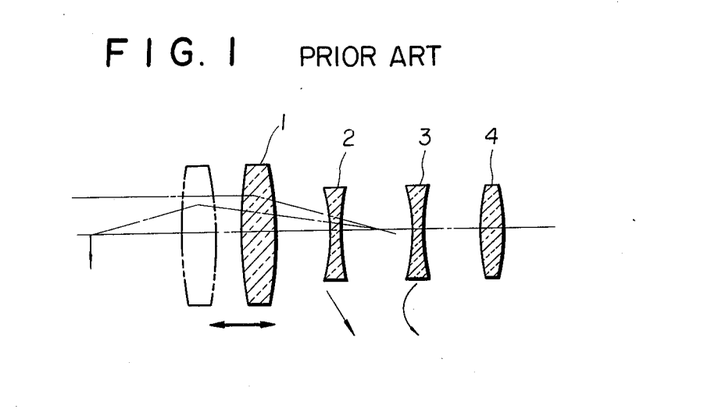
FIG. 1 is a drawing to show a zoom lens belonging to a conventionally known technology.
Figures 2A, 2B:
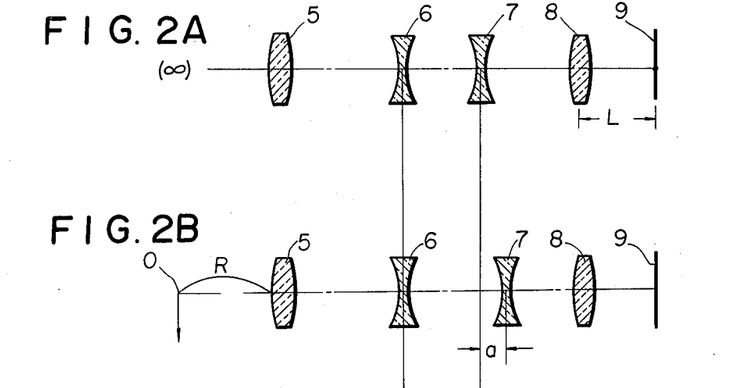
FIG. 2A, FIG. 2B and FIG. 2C are drawings to explain the principle of the present invention.
Figure 2C:
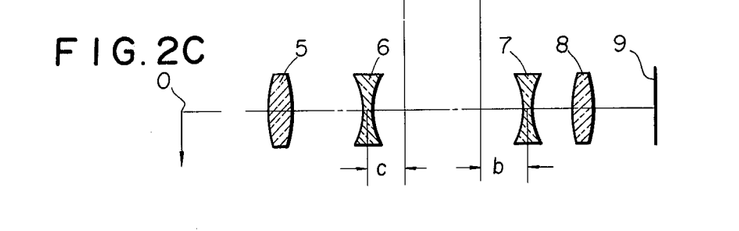

DESCRIPTION OF THE PREFERRED EMBODIMENTS:

Now the principle of the present invention shall be explained. In FIG. 2A, FIG. 2B and FIG. 2C the numbers 5, 6, 7 and 8 show each lens group, respectively, wherein the lens groups 5 and 8 are fixed. 9 is a focal plane and 0 is an object at any given position. L is a back focus.

The lens position shown in FIG. 2A is a basic position of a zoom lens system, for example it is a state in which focus is on an object at an infinite position at a telescopic end. In FIG. 2B, for bringing focus onto an object 10 which is at the distance of R from the front end of the lens group 5, the lens group 7 is shifted as much as "a" from the state of the lens shown in FIG.

2A. Next, the drawing of the state where zooming is completed and the system is stopped at any desired position is FIG. 2C, wherein as the lens group 6 for magnification variation is shifted as much as "a", the lens group 7 is shifted as much as "b" for bringing focus on the object 10. At this time b forms a certain functional relation, > $b = f(a, c)$ with the variables a, c. Here $f(a, c)$ is a function determined by the refractive power and length of principal points of the lens system. As shown above, focusing is done by the fact that b satisfies $(a, c)$ when a, c are determined, and this principle could be applied in various ways according to various types of zoom lenses. For example the lens group 8 may be made movable in lieu of the lens group 7. While the lens group 5 in FIG. 2 is provided solely for aberration correction, the lens group 5 may be used in place of the lens group 6, but then the outer diameter of the lens will become large. Further, there is a variator lens group and a compensator lens group as in an ordinary zoom lens, and it is possible to divide the last lens group 8 into two groups and one of them is used for focusing.

Now explanations will be made on examples.

Figure 3:
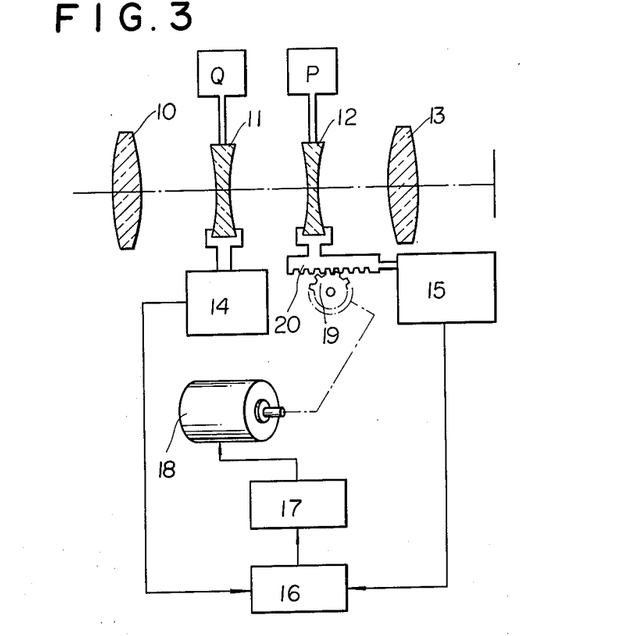
FIG. 3 is an outline sketch to show a concrete example of the present invention.

In FIG. 3, 10 and 13 are fixed lens groups while 11 is a magnification variation lens group and 12 is a compensation lens group. And 14 is a detection means to detect the amount of shifting of the magnification variation lens group 11 and to convert the same into an electric signal. 15 is a similar detecting means related to the lens group 12.

16 is an operation circuit into which the signals from both detecting means are supplied, and 17 is a driving circuit for actuating a motor 18 with the signal from the operation circuit, 19 is a gear driven by the motor 18. 20 is a rack engaged with the gear 19 and is used for shifting the lens group 12 to the direction of optical axis.

Now certain functions will be explained. As explained in FIG. 2A, FIG. 2B and FIG. 2C, first, focus adjustment is done by shifting a holding means P of the lens group 12 in the direction of the optical axis by motor driving or manually, then zooming is done by moving a holding means Q of the lens group 11 in the direction of optical axis by motor driving or manually, then the detecting means 14 and 15 detect the amount of shifting a of the lens group 12 and the amount of shifting c of the lens group 11, respectively and the same are converted to electric signals, which are transmitted to the operation circuit 16.

In the operation circuit, a predetermined operation is done and the signal of the result of said operation is supplied to the driving circuit 17. Based on said signal, the motor 13 is driven, and the motor 18 rotates the gear 19, shifting the rack 20, then the lens group 12 is shifted to the position of the amount of shifting b which is the result of the above mentioned operation and is stopped, thus focusing is completed.

Figure 4:
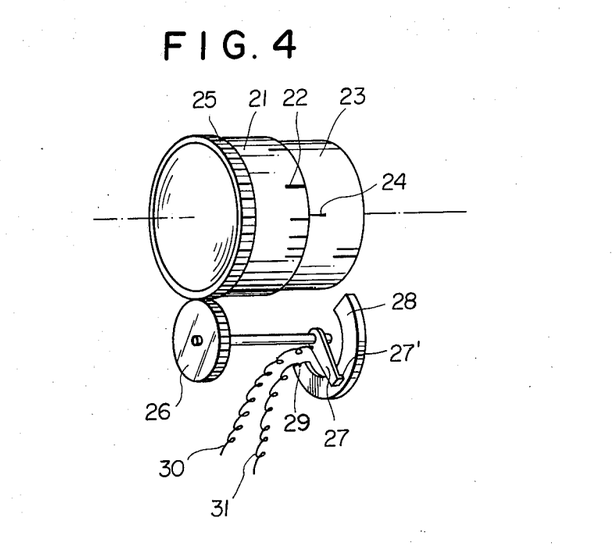
FIG. 4 is an oblique view to show an example of a detecting means according to the present invention.

FIG. 4 shows a concrete example of the detecting means, and 21 in the drawing is a drum attached to a main body of camera which is not shown in the drawing in a freely rotatable manner around its own center as an axis, while 23 is a lens barrel by which the lens groups are retained, wherein said both parts are coupled for example by a helicoid. The drum 21 is rotated around optical axis by a rotating means not being shown in the drawing and the angle of its rotation is related with the amount of shifting to and fro of the movable lens groups. Indication marks 22 are carved on the drum 21 and its matching with a similar mark 24 on the lens barrel 23 is used to find the set values of the focal distance or the imaging distance at that lens position.

On the other hand a gear 25 is provided on the drum 21 and said gear 25 engages with a small gear 26. A sliding piece 27 is integrally fixed to the small gear 26, and is rotated along with the rotation of the small gear 26. A brush 27' provided at the forward end of the sliding piece 27 is shifted while it keeps contact with the surface of a resistor body 28, and a lead wire 30 is attached to the sliding piece 27 while a lead wire 31 is attached to one end 29 of the resistor body 28. In this resistor body 28, the output to the lead wire 30 and that to the lead wire 31, as the distance from the one end 29 to the contact with the brush 27' varies, will have a predetermined proportional relationship, therefore the rotation of the sliding piece 27 and the amount of shifting of the lens group along with the rotation of the drum 21 by the gear 25 are proportionate with the output obtained by the resistor body 28 and the amount of the detection thereof is input in the operation circuit.

The above is one example of the detecting means, while other means such as Magnescale (commercial name) may also be used.

The output from members 14, 15 (FIG. 3) which use this kind of detecting means is impressed in the operation circuit 16. In the operation circuit 16, by the set values of focal distance and imaging distance an output is obtained according to a functional equation $b = f(a,c)$ determined in designing the zoom lens.

In detecting said amount of shifting, if the amount to be detected is an analogue value the operation circuit can be easily formed by a commonly known analogue operation circuit, and if it is the output from a rotary encoder, namely the displacement of a graduated scale, or a Magnescale, etc., i.e., a digitalized value the operation circuit may be easy formed similarly by an ordinary digital circuit.

When for example a direct current motor, etc. is used as the motor 18, a feedback circuit may be formed with a position detecting means connected to the lens group 12. Also when a stepping motor is used by the pulse shape output corresponding to the input of the driving circuit a further simple position detecting means for the lens group 12 may be formed. Here whether the operation is done in digital system or in analogue system may be decided as desired depending on the speed or accuracy in detection, operation and position setting further on cost, etc.

Figure 5:
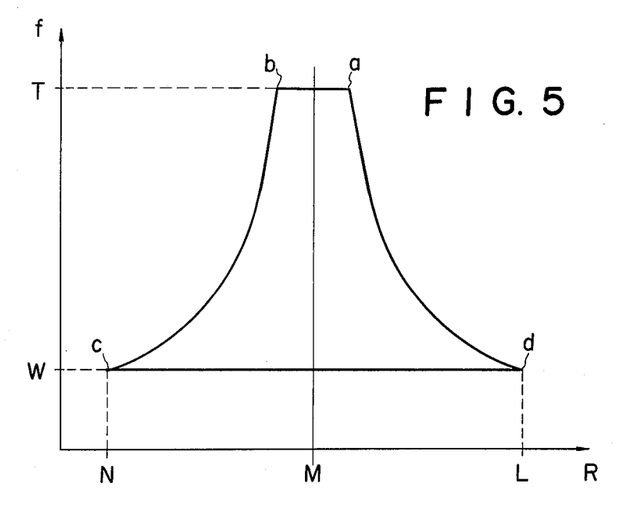
FIG. 5 is a graph to show a zone where photographing is possible.

As has been explained above the present invention introduces an electric system newly to a control system for shifting of zoom lens having a small F-number in high magnification and having been developed so far only by the principle of conventional geometrical optics. On the other hand the accuracy in setting the position of the movable lens groups in a zoom lens system varies depends on the focal distance and the object distance. This relationship will be now explained now. In FIG. 5, the focal distance $f$ of a zoom lens system is expressed by the axis of ordinates while the distance R to an object is shown by the axis of abscissa. The mark T shows the position of a long focal point that is telescopic focus while W indicates the position of a short focal point that is wide angle. Also L is for a case when an object is located at an infinitely far point, and N is for a case when it is at short distance.

When the focus is brought to an object at any given distance, that is in the case of mark M, the depth of field of photographing allowed when the aperture of the lens system is fully opened will be within the zone encircled by the curves and straight lines, $a - b - c - d$, in the drawing, and as the depth of field of photography becomes smaller as moving from wide angle to telescopic end, the accuracy requirement for position setting becomes severe. Also as the distance to an object becomes large the depth of the field of photography becomes large, thus requirement for positional accuracy becomes tolerant.

Figure 6A:
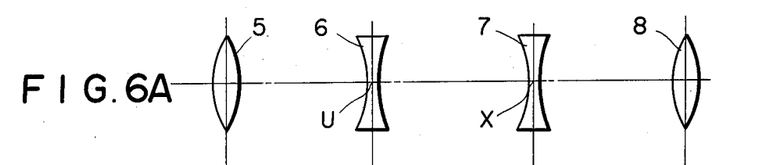
FIGS. 6A, 6B and 6C are drawings to explain the shifting relationship of lens systems according to the present invention.
Figure 6B:
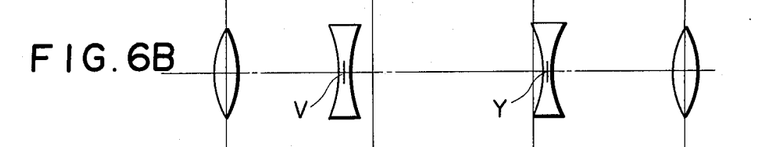
Figure 6C:
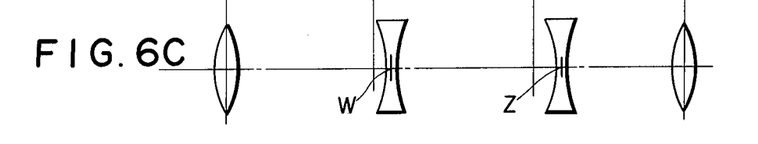

Now, as an example, the relationship between the extent of the depth of photographing field and the position of each lens group in a zoom lens when magnification variation is made while the object distance is constant will be shown in FIG. 6A, FIG. 6B and FIG. 6C. FIG. 6A shows the case of long focal distance that is telescopic, FIG. 6C shows the case of short focal distance that is wide angle, and FIG. 6B shows the intermediate case between the two. The lens group 6 moves between positions U - V - W corresponding to telescopic - standard - wide angle. On the other hand the lens group 7 moves between the positions X - Y - Z. In this case the position setting accuracy for the lens group 6 which serves as a variator needs to be made higher in the order of U - V - W. On the other hand, same degree of accuracy will be satisfactory for positions, X, Y, Z, alike for the lens group 7 as it works for compensating the variation of imaging plane as magnification variation is effected. It should be noted here that the accuracy in the above explanation applies to such lens composition as comprising a front convergent lens group, a divergent variator lens group, a divergent compensator lens group and a relay lens group, and the accuracy requirement will be different from those mentioned above in a zoom lens system having different lens group composition.

Figure 7:
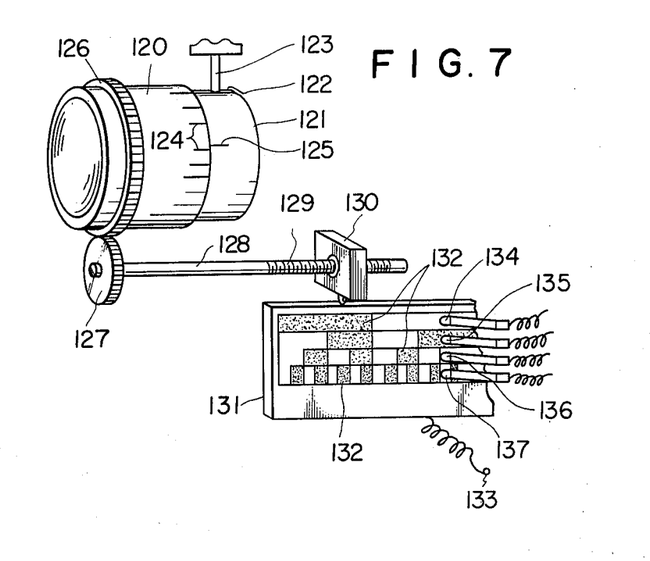
FIG. 7 is an oblique view to show another example of the detecting means.

Next, explanations will be made on an example of a position detecting device used in setting position with high degree of precision. In FIG. 7, 120 is a drum being held by a camera main body which is not shown in the drawing around an optical axis in a freely rotatably manner, having a helicoid provided therein, and at said portion it is coupled with the helicoid provided at external plane of an inner tube 121. At the inside of said inner tube 121 for example a variator lens group is attached.

122 is a guide groove and a guide pin 123 engages with said groove 122 and the guide pin is planted on a camera main body not shown in the drawing. The role of this guide groove and the pin is to guide the inner tube 121 for shifting the same to a direction of optical axis without rotation.

And indication marks 124 are punched on the drum 120 and a fixed mark 125 is punched on the inner tube 121, and they are helpful for reading off the set information.

Further, a gear 126 is provided at the drum 120 in a manner being integral with the drum, and this gear 126 engages with a small gear 127 which rotates around a shaft 128 and transfer screw 129 is provided at a portion of the shaft 128. This transfer screw 129 engages with the female screw provided on a shifting member 130 and to the shifting member a plate encoder 131 is provided. On said plate encoder 131, for example conductors 132 are positioned in accordance with a predetermined rule, and all of these conductors are connected to a terminal 133 at their one ends.

On the other hand contacting pieces 134, 135, 136 and 137 are pressure contacted to these conductors. Now, attention is invited to the terminal 133 and the contacting piece 134. As the plate encoder 131 is shifted along with the shifting of the shifting member 130 that is the rotation of the drum 120, thus the conductance and non-conductance between the terminal 133 and the contacting piece 134 will be decided by the rotation angle of the drum 120 which is rotated manually or electrically.

That is by the relative positional relationship between the plate encoder 131 and the contacting pieces the combination of conductance and non-conductance between the terminal 133 and each of the contacting pieces 134, 135, 136, 137 will vary, and it will become possible to obtain the position of the variator lens group from the state of combination as coded digital signals.

Such detection will be the role of the detecting device 14 in FIG. 3. Similar means may be provided also for the compensator, that will be equivalent to 15 in FIG. 3.

Figure 8:
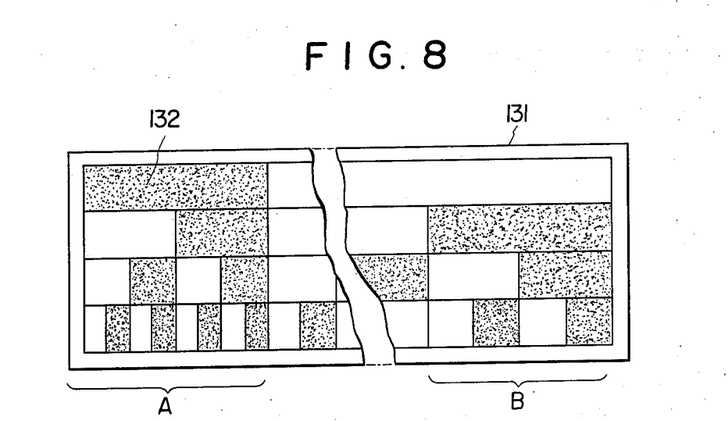
FIG. 8 is a partial enlargement of the same.

And in making such detection of position, it is reasonable to so form the pattern of the conductors in the encoder as shown in FIG. 8 depending on whether the position requires only low accuracy in position setting or the position requires high accuracy.

That is in an end part A, where high accuracy is required for position setting, that is in the case of detection of position near telescopic position, the conductors are positioned closely, while when the accuracy in position setting may be low that is in the case of wide angle the arrangement of the conductors and non-conductors is rough as in the end part B. When focus is placed on an object the arrangement of the positions in the encoder will be rough when focusing is done on a distant object, and will have a close arrangement when focusing is done for a near object.

Next, the degree of accuracy will be determined from the depth of field which varies depending on the state of diaphragm aperture of lens.

In this phase of the present invention, it will be first characteristics to determine the accuracy in position setting of the lens groups depending on the depth of field, that is, the set value of the diaphragm aperture of the lens system.

Next, the second characteristics of the same exists in that since the accuracy of zooming is determined by the detecting accuracy of the set values of focal distance and imaging position, and by the accuracy in position setting of the compensator lens group, and since the response time of zooming is determined by the speed of operation means, the significant figures for operation are selected to make the accuracy of position setting of the lens groups such reasonable accuracy as related to the set value of diaphragm aperture of the lens system and to the above mentioned two set values, and at the same time it exists in improving the response time.

Figure 9:
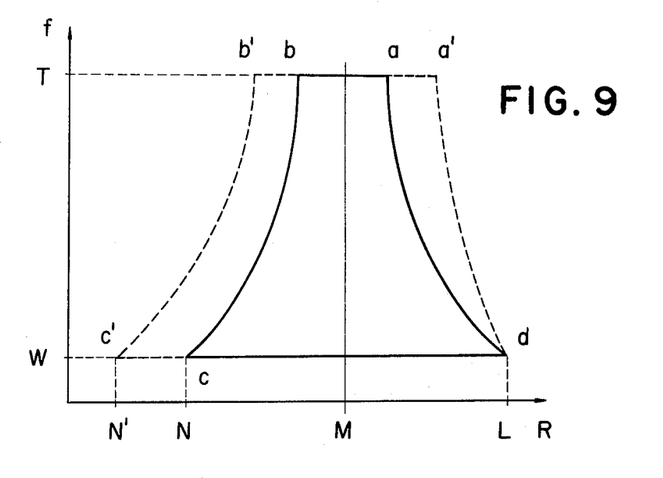
FIG. 9 is a graph to show the relationship between the state of diaphragm aperture and the zone where photographing is possible.

Next, explanations will be made on the relationship between the focal distance set value, the imaging position set value, the diaphragm aperture set value and the accuracy. In FIG. 9 the focal distance $f$ of the zoom lens system is shown by the axis of ordinates while the distance R to an object is shown by the axis of abscissa. The mark T indicates the position of long focal point that is of telescopic, while W shows the position of short focal point that is of wide angle. Also L represents the case when an object is located at an infinitely far position, N shows the case when it is at sort distance, and N' the case when it is at even shorter distance.

Now the depth of field allowed as the lens system is fully opened when focusing is made on an object located at any given distance (that is the case of the mark M) will be within the zone being encircled by the curves and straight lines, $a - b - c - d$, and the depth of field becomes shallow as moving from wide angle to telescopic end and varies as well known depending of the distance to an object.

Next as the diaphragm aperture of the lens system is stopped down the zone encircled by the straight lines and curves $a' - b' - c' - d'$ within the same graph will come in the depth of field. That is the more diaphragm aperture is stopped down the extent of depth of field is enlarged and the setting accuracy requirement becomes relatively less severe. FIG. 6A, FIG. 6B and FIG. 6C show the relationship between the variation of the focal distance and the position of each of the lens groups of the zoom system when magnification variation is made while the distance to an object is kept constant. The positional arrangement of FIG. 6A shows the case of long focal point distance that is telescopic, FIG. 6C is for short focal point distance that is wide angle and FIG. 6B is the intermediate case. The lens group 6 moves its position as U - V - W according to telescopic - standard - wide angle.

On the other hand the lens group 7 moves its position as X - Y - Z. In this case the accuracy in position setting of the lens group 6 which serves as a variator needs to be made higher as moving in the order of U, V, W, and on the other hand the lens group 7 which works for compensation of shifting of the imaging plane by these lens groups can have same degree of accuracy in each of the positions, X, Y. Z.

As has been explained above the setting accuracy of the lens groups should desirously be varied depending on the focal distance, the distance to an object and the diaphragm aperture value. And in the case of position setting of the lens group 12 shown in FIG. 3, it is apparent that if the diaphragm aperture setting information of the lens system is added to the operation circuit 16 beside the positional information of the lens group 12, that is the distance information and the positional information of the lens group 11, which in short means focal distance information and the significant figures of the result of operation by the above mentioned two informations are selected by the former information, the time required for operation can be shortened. By this the setting time for the lens group 2 becomes short allowing farther high speed zooming.

Figure 10:
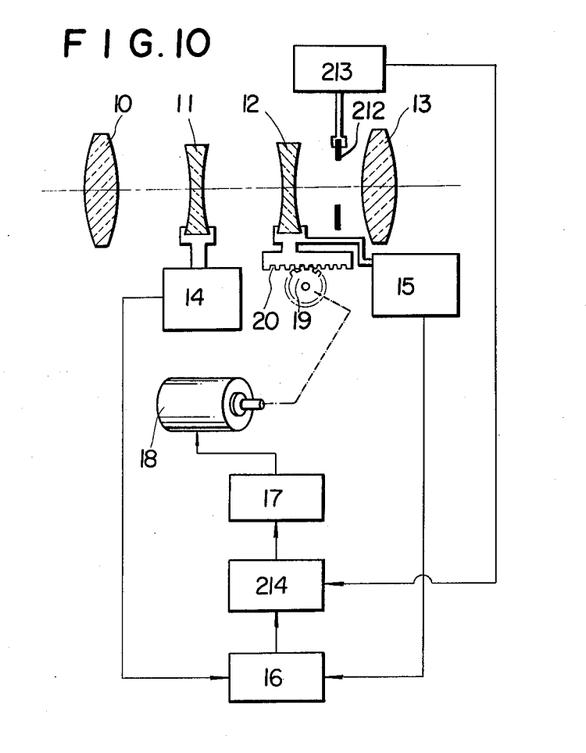
FIG. 10 is a drawing to show a modified example of the present invention is modified.

Next a block diagram for an embodiment is shown in FIG. 10. In this drawing the parts identified with the same numbers as those used in FIG. 3 represent similar members performing similar function. 212 is a diaphragm, 213 is a diaphragm aperture value detecting means and 214 is a circuit to select significant figures. A typical prior art variable iris diaphragm is shown as 70 in U.S. Pat. No. 3,514,841 to Barr et al. The signal from a first detecting means 14 and the signal from a second detecting means 15 are inputed into an operation circuit 16, wherein the position at which a lens group 12 is to be set is operated according to a given functional equation. While the output from said circuit is inputed into the significant figure selecting circuit 214, and here for example, when the operation circuit 16, etc. is formed in digital system, the figures involved may be so formed as selecting such various methods as a well known method of counting fractions of 5 and over as a unit and disregard the rest at one figure down from the required unit, a method to round off the number in said unit, or a method to disregard fractions of 3 or less and count fractions of 7 or more as one unit at one step down from the required unit, further fractions of 4 to 6 there are counted as the fractions of 5, etc. And at that time the designation of the number of figures of significant figures is done according to the output signal from the means 13 to detect the set value of the diaphragm 12.

Or, selection of significant figures may also be done within the operation circuit 16.

In detecting diaphragm aperture value it is effective to use a disk shape encoder which is linked with a lever to actuate diaphragm blades, and in that case as the rotation angle of the lever varies by F-value it is better to vary the density of array on the encoder.

As has been explained above the present invention has such set-up that as the accuracy in setting the lens groups varies depending on the focal distance of the lens system, the distance to an object and the diaphragm aperture value, when for example an encoder is used as a detecting means when detecting the set value of the focal distance and the set value of the distance to an object, the detecting accuracy of said encoder varies as required, further the detected value from the diaphragm aperture value detecting means is added so that setting of the lens group with high accuracy and high speed is made possible. And high speed zooming is made possible by further selecting significant figures.

Next, an example of an operation done in an operation means composed by electronics circuits will be explained by way of a simplified example. In an optical system shown in FIG. 11, I is a front fixed (lens) group, II is a variator, III is a compensator, and IV is a focusing lens group and serves as a compensator in case of a close distance photographing. It is also possible naturally to use the group III and the group IV as a lens group having one function. Also, $S_1$ is a distance from an object to the front plane of the group I, $0_1$ is a position of front principal point of the group I. $f_1$ is a focal distance of the group I. $f_2$ is a focal distance of the group II. $f_3$ is a focal distance of the group III. $f_4$ is a focal distance of the group IV.

Figure 11:
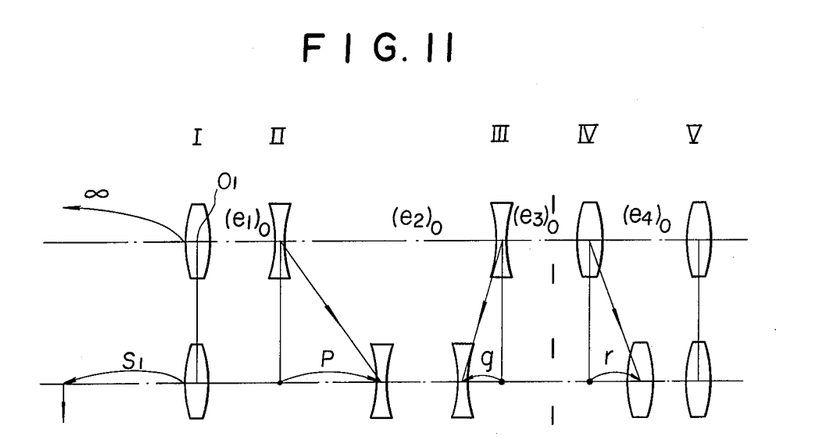
FIG. 11 is a simplified example of an operation according to the invention.

And when an object is located at an infinitely far distance and the optical system takes the shortest focal distance, $(e_1)_o$ is a distance between principal points of the group I and the group II. $(e_2)_o$ is the distance between the principal points of the group II and the group III. $(e_3)_o$ is the distance between the principal points of the group III and the group IV. And $(e_4)_o$ is the distance between the principal points of the group IV and the group V. Q is the distance between an image point formed by the group IV and the front principal point of the group V. $\Delta_4$ is the distance between principal points within the group IV.

In the above mentioned set-up when the group II only is shifted as much as p, g represents the amount of shifting of the group III, and r represents the amount of shifting of the group IV which is seeked here. C is a constant and is determined automatically from $f_1, f_2, f_3, f_4, (e_1)_o, (e_2)_o, (e_3)_o, (e_4)_o, Q, 0_1, \Delta_4$.

Here, the function explained in the FIG. 2A, FIG. 2B and FIG. 2C may be regarded as $r = f(S_1, C)$, and the value of r may be determined by the operation shown below. The equations provide the relationship between an object point and an image point in geometrical optics, and r is obtained by executing the operations (1) to (21).

|  |  | solution | substitution |
|---|---|---|---|
| (1) | $a_1 = S_1 - O_1$ | $\rightarrow a_1 \rightarrow$ | (2) |
| (2) | $\frac{1}{b_1} - \frac{1}{a_1} = \frac{1}{f_1}$ | $\rightarrow b_1 \rightarrow$ | (4) |
| (3) | $e_1 = (e_1)_o + P$ | $\rightarrow e_1 \rightarrow$ | (4) |
| (4) | $a_2 = b_1 - e_1$ | $\rightarrow a_2 \rightarrow$ | (5) |
| (5) | $\frac{1}{b_2} - \frac{1}{a_2} = \frac{1}{f_2}$ | $\rightarrow b_2 \rightarrow$ | (17) |
| (6) | $(a_2)_o = f_1 - (e_1)_o$ | $\rightarrow (a_2)_o \rightarrow$ | (7), (8) |
| (7) | $\frac{1}{(b_2)_o} - \frac{1}{(a_2)_o} = \frac{1}{f_2}$ | $\rightarrow (b_2)_o \rightarrow$ | (8), (10) |
| (8) | $A = -\{(a_2)_o + (b_2)_o\}$ | $\rightarrow A \rightarrow$ | (14) |
| (9) | $B = -\{(a_2)_o + f_2\}$ | $\rightarrow B \rightarrow$ | (14) |
| (10) | $(a_3)_o = (b_2)_o - (e_2)_o$ | $\rightarrow (a_3)_o \rightarrow$ | (10), (12) |
| (11) | $\frac{1}{(b_3)_o} - \frac{1}{(a_3)_o} = \frac{1}{f_3}$ | $\rightarrow (b_3)_o \rightarrow$ | (12), (13) |
| (12) | $C = (a_3)_o + (b_3)_o$ | $\rightarrow C \rightarrow$ | (15) |
| (13) | $D = -4\{(b_3)_o - f_3\}$ | $\rightarrow D \rightarrow$ | (15) |
| (14) | $\eta = \frac{P^2 + AP}{P + B}$ | $\rightarrow \eta \rightarrow$ | (15) |
| (15) | $q = \frac{\eta + C + \sqrt{(\eta + C)^2 + D\eta}}{2}$ | $\rightarrow q \rightarrow$ | (19) |
| (16) | $e_2 = (e_2)_o - P + q$ | $\rightarrow e_2 \rightarrow$ | (17) |
| (17) | $a_3 = b_2 - e_2$ | $\rightarrow a_3 \rightarrow$ | (18) |
| (18) | $\frac{1}{b_3} - \frac{1}{a_3} = \frac{1}{f_3}$ | $\rightarrow b_3 \rightarrow$ | (19) |
| (19) | $L = Q - B_3 + (e_3)_o + (e_4)_o + \Delta_4 - q$ | $\rightarrow L \rightarrow$ | (20) |
| (20) | $x' = \frac{L - (2f_4 + \Delta_4) + \sqrt{L - (2f_4 + \Delta_4)^2 - 4f_4^2}}{2}$ | $\rightarrow x' \rightarrow$ | (21) |
| (21) | $r = (e_4)_o + Q - x' - f_4$ | $\rightarrow r$ |  |

What is claimed is:

1. A zoom lens system without a single focusing lens at the front part of the lens system comprising:
   a variation movable lens group relating to the focal length of the whole optical system and being capable of moving along the optical axis;
   a compensation movable lens relating to focusing and being capable of moving along the optical axis;
   a fixed lens group in front of the movable lens groups;
   a diaphragm;
   a fixed lens group in front of a photosensitive material plane;
   a first detecting means for detecting the distance, $c$, between the actual position of said variation movable lens group and the basic position of magnification variation in order to supply a magnification variation signal;
   a second detecting means to detect the distance, $a$, between the actual position of said compensation movable lens group and the basic position of compensation in order to provide a compensation signal, wherein the basic position of compensation is determined as a position in which focus is on an object at an infinite position when said compensation movable lens group is at said basic position and variation movable lens group is fixed at said basic position of magnification variation;

an operation means responsive to said compensation signal and said magnification signal for providing a control signal corresponding to the desired distance, $b$, between the position of said compensation lens group and said basic position of compensation, said operation means providing said signal in accordance with a predetermined functional relationship of distances c and a of the variation movable lens group and said compensation movable lens group; and a setting means to set said compensation movable lens group at a position on the optical axis in response to said control signal.

2. The zoom lens system according to claim 1, wherein said first detecting means is formed so that the detecting accuracy varies depending on the position taken by the movable lens group for magnification variation on the optical axis.

3. The zoom lens system according to claim 2, wherein said detecting means are encoders and the pitch of the signal generating element of the encoder is different depending on the location.

4. The zoom lens system according to claim 1, wherein the fixed lens group is provided at the position nearer to an object than the movable lens groups.

5. The zoom lens system according to claim 4, wherein the positive fixed lens group, the negative movable lens group having a function of magnification variation, the negative second movable lens group, and the positive fixed lens group are arranged in position in the recited order from the object side.

6. The zoom lens system according to claim 1, wherein said detecting means contain movable reistors.

7. The zoom lens system according to claim 1, wherein said detecting means contain encoders.

8. The zoom lens of claim 1, wherein said means for determining desired position $b$ employs a functional relationship with respect to distances $a$ and $c$ which is determined by the refractive power of the lens system and the length of principal points.

9. In a zoom lens system having a diaphragm and a fixed lens group in front of a plane for photosensitive material, a movable magnification variation lens group and a movable compensation lens group, said magnification lens group being closer to the object side of said zoom lens system, said magnification and compensation being lens groups at a basic position when focus of said zoom lens is on an object at an infinite position, the improvement comprising:

means for shifting said compensation lens group a distance $a$ from said basic position;

first detecting means for detecting the shifted distance of said compensation lens group and for providing a signal corresponding thereto;

means for shifting said magnification lens group a distance $c$ from said basic position;

second detecting means for detecting the shifted distance of said magnification lens group and for providing a signal corresponding thereto;

means for determining the desired position $b$ relative to said basic position of said compensation lens group after shifting of said compensation and magnification lens group and for providing a control signal, said determination being made as a function of the distances $a$ and $c$; and means for positioning said compensation lens at said distance $b$ in response to said control signal.

* * * * *